(12) United States Patent
Ritche (10) Patent No.: US 6,845,394 B2
(45) Date of Patent: Jan. 18, 2005

(54) SOFTWARE DELIVERY METHOD WITH ENHANCED BATCH REDISTRIBUTION FOR USE IN A DISTRIBUTED COMPUTER NETWORK

(75) Inventor: Scott D. Ritche, Centennial, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 730 days.

(21) Appl. No.: 09/835,507

(22) Filed: Apr. 16, 2001

(65) Prior Publication Data

US 2002/0152290 A1 Oct. 17, 2002

(51) Int. Cl.[7] .............................................. G06F 15/177
(52) U.S. Cl. ...................... 709/221; 709/244; 717/171; 717/176; 714/43
(58) Field of Search ................................ 709/220–224, 709/244, 250; 717/171–173, 176–178; 714/43

(56) References Cited

U.S. PATENT DOCUMENTS

| | | | |
|---|---|---|---|
| 5,396,613 A | 3/1995 | Hollaar .................... 395/575 |
| 5,630,116 A | 5/1997 | Takaya et al. ............. 395/617 |
| 5,634,008 A * | 5/1997 | Gaffaney et al. ........... 709/224 |
| 5,696,486 A * | 12/1997 | Poliquin et al. ............ 709/224 |
| 5,919,247 A | 7/1999 | Van Hoff et al. ........... 709/217 |
| 5,933,647 A | 8/1999 | Aronbert et al. ............ 395/712 |
| 5,987,497 A | 11/1999 | Allgeier ..................... 709/201 |
| 6,031,533 A | 2/2000 | Peddadda et al. ........... 345/349 |
| 6,035,423 A | 3/2000 | Hodges et al. ............... 714/38 |
| 6,110,228 A | 8/2000 | Albright et al. .............. 717/11 |
| 6,389,426 B1 * | 5/2002 | Turnbull et al. ............ 709/224 |
| 6,526,447 B1 * | 2/2003 | Giammaria ................. 709/224 |
| 6,581,092 B1 * | 6/2003 | Motoyama et al. .......... 709/224 |
| 6,591,296 B1 * | 7/2003 | Ghanime ................... 709/224 |
| 6,604,237 B1 * | 8/2003 | Giammaria ................. 717/174 |
| 6,704,782 B1 * | 3/2004 | Achtermann et al. ....... 709/224 |
| 2002/0152290 A1 * | 10/2002 | Ritche ....................... 709/244 |
| 2003/0110248 A1 * | 6/2003 | Ritche ....................... 709/224 |

* cited by examiner

Primary Examiner—Fritz M. Fleming
(74) Attorney, Agent, or Firm—Kent A. Lembke; William J. Kubida; Hogan & Hartson LLP (57) ABSTRACT

A method, and associated computer system, for redistributing software packages in a distributed computer network after a failed distribution attempt is made in a distributed computer network by a master network device. The method includes determining which intermediate distribution devices or servers were affected by the failed distribution. Then for each of these devices, identifying a distribution job that failed and retrieving from the particular distribution device stored distribution parameters, such as distribution control commands, a set of distributed packages, and a distribution list, used in the failed distribution. The method continues with building new distribution commands for the failed distribution job from the retrieved distribution parameters and then performing a redistribution of the set of software packages utilizing the new distribution commands.

26 Claims, 3 Drawing Sheets

SOFTWARE DELIVERY METHOD WITH ENHANCED BATCH REDISTRIBUTION FOR USE IN A DISTRIBUTED COMPUTER NETWORK

RELATED APPLICATIONS

The present invention is related to U.S. patent application Ser. No. 09/779,147, filed Feb. 8, 2001, for "Automated Service Support of Software Distribution in a Distributed Computer Network."

BACKGROUND OF THE INVENTION

1. Field of the Invention

The present invention relates, in general, to software package distribution in a distributed computer network, and, more particularly, to a system and method for responding to distribution error messages by servicing the distribution system, for accessing and processing distribution data at a service center and an affected intermediate distribution server, and for issuing a new distribution job from the intermediate distribution server that replicates the failed distribution effort.

2. Relevant Background

Distributed computer networks with de-centralized software environments are increasingly popular designs for network computing. In such distributed computer networks, a copy of a software program (i.e., an application package such as Netscape™, StarOffice™, and the like) is distributed over a data communications network by a master or central network device for installation on client network devices that request or require the particular application package. The master network device may be a server or a computer device or system that maintains current versions and copies of applications run within the distributed computer network.

When an application is updated with a new version or with patches to correct identified bugs, the master server functions to distribute updated application packages through one or more intermediate distribution servers and over the communications network to the appropriate client network devices, i.e., the devices utilizing the updated application. The client network device may be an end user device, such as a personal computer, computer workstation, or any electronic computing device, or be an end user server that shares the application with a smaller, more manageable number of the end user devices within the distributed computer network. In this manner, the distributed computer network provides stand-alone functionality at the end user device and makes it more likely that a single failure within the network will not cripple or shut down the entire network (as is often the case in a centralized environment when the central server fails).

While these distributed computer networks provide many operating advantages, servicing and correcting distribution to these client network devices during software installation and operation are often complicated and costly tasks. Correcting a failed distribution typically requires the redistribution of the package to each of the devices that did not receive the package, e.g., all devices downstream in the network from an affected or faulting device or server. To be effective, the redistribution preferably issues the redistribution command to assure use of the same installation parameters (i.e., the distribution command strings), the same distribution list, and the same packages.

However, servicing the network prior to redistribution and replicating the distribution process has been problematic and costly due to several factors. The networks often include large numbers of client network devices, such as intermediate distribution servers, end user servers, and end user devices upon which applications must be installed and which must be accessed and serviced when distribution problems occur. Additionally, the client network devices may be located nearly anywhere as the use of the Internet as the distribution path enables application packages to be rapidly and easily distributed worldwide. The master server is typically located in a geographic location that is remote from the intermediate distribution servers and client network devices, which further complicates servicing of the devices as repair and redistribution personnel need to be deployed at or near the location of the failing device such as from a regional or onsite service center. Efforts have been made to facilitate effective application package distribution and installation in numerous and remotely-located client network devices (see, for example, U.S. Pat. No. 6,031,533 to Peddada et al.). However, existing software distribution systems do not meet the industry need for effective package redistribution and servicing of network devices prior to redistribution.

Generally, during operation of a distributed computer network, a master server executing a distribution tool operates to distribute an application package over the communications network through intermediate distribution servers to a number of remote end user servers and end user devices. The receiving devices may be listed as entries in a network distribution database which includes a delivery address (e.g., domain and/or other information suiting the particular communications network), a client node network name, package usage data (e.g., which packages are used or served from that client network device), and other useful package distribution information. A distribution list is created for a particular application, and the distribution tool uses the list as it transmits copies of the application package to the intermediate distribution servers for final distribution to the appropriate end user servers and end user devices for installation.

If delivery fails, the affected or upstream client network devices or intermediate servers transmit error messages back to the distribution tool. In a relatively large network, the distribution tool may receive hundreds, thousands, or more error messages upon the distribution of a single application package. In many distributed computer networks, a service desk device or service center (e.g., a computer system or a server operated by one or more operators that form a service team) is provided to respond to software installation problems by issuing service requests and performing the steps necessary to redistribute the software packages. In these networks, the distribution tool gathers all of the error messages and transmits them to the service desk as error alerts. For example, the distribution tool may send e-mail messages corresponding to each error message to the e-mail address of the service desk to act on the faults, errors, and failures in the network.

The operator(s) of the service desk must then manually process each e-mail to determine if service of the network or client network devices is required, which service group is responsible for the affected' device, and what information is required by the service department to locate the device and address the problem. If deemed appropriate by the operator, the service desk operator manually creates (by filling in appropriate fields and the like) and transmits an electronic service request, i.e., service job ticket, to a selected service group to initiate service. The receiving service group then processes the job ticket to assign appropriate personnel to fix the software or hardware problem in the network device.

To redistribute the failed packages, the operator then typically has to first determine all distributions that failed during the time the affected devices, such as an intermediate distribution server, were down or inoperable for software package distribution. To perform this determination, the operator may have to access the distribution logfiles of the master device and/or interface with the distribution tool with the identified time period. The operator then manually restages each of the failed distributions by going to the physical location of the intermediate distribution server and accessing data in a distribution logfile stored on the server. The distribution data includes the names or identifications for the packages included in the failed distributions for dates in the identified time period and, significantly, the distribution command strings which provide the original parameters (such as a command to replace the existing software with the distributed software) used in the failed distribution. Access to the intermediate distribution server is often obtained through a user interface (such as a graphical user interface).

Problems and inefficiencies are created by the use of the existing service and redistribution methods. The manual identification of a downtime and of distribution lists and data is a time consuming and costly process. Further, the manual "restaging" allows a number of data entry errors to creep into the process. Similarly, the manual processing of the error alerts from the distribution system can rapidly overwhelm the service desk resulting in service delays or require large numbers of personnel to timely respond resulting in increased service costs. The manual processing of the error alerts also results in errors as the human operator may incorrectly fill out a job ticket with insufficient and/or inaccurate information making repair difficult or impossible.

Hence, there remains a need for an improved method and system for distributing software in a distributed computer network. Such a method and system preferably would be useful for enhancing servicing the problem that caused distribution failure and for improving (i.e., reducing errors and lowering costs and time requirements) the redistribution process. Further, the improved redistribution method and system preferably would insure that original distribution lists and distribution parameters are retrieved and utilized in the redistribution such that the software package is distributed and installed as initially intended.

SUMMARY OF THE INVENTION

The present invention addresses the above discussed and additional problems by providing a software distribution system including an auto ticket tool for processing numerous error alerts issued during distribution of application packages to correct an underlying network or device problem. A redistribution tool is provided that automates the redistribution of the packages not delivered due to the problem. The redistribution tool is designed to be run on an intermediate distribution server affected by the problem and to automatically identify failed distribution jobs, to retrieve distribution parameters from the intermediate distribution server, and to build a redistribution command set for each failed distribution job. The redistribution commands are then issued to a distribution manager on the intermediate distribution server to begin redistribution of the packages. The constructed redistribution commands include the retrieved, original distribution parameters, which allows installation of the packages on the recipient devices as if the initial distribution had been successful.

Briefly stated, a method is provided for redistributing software packages in a distributed computer network after a master network device makes a failed distribution attempt. The method includes determining which intermediate distribution devices or servers were affected by the failed distribution. Then for each of these devices, identifying a distribution job that failed and retrieving from the particular distribution device stored distribution parameters, such as distribution control commands, used in the failed distribution. The method continues with building new distribution commands for the failed distribution job from the retrieved distribution parameters and the performing a redistribution of a set of software packages utilizing the new distribution commands.

According to another aspect of the invention, a method is provided for processing error alerts created in a computer network due to failures arising in distribution of a software or application package to network devices. The error alerts generally include a large amount of information related to the package distribution failure. The method includes receiving an error alert and then processing the error alert to identify from the error alert information which type of failure is announced or believed to have caused the failure. Next, an error tracking file containing tracking values for each of the failure types is updated to incrementally change the tracking value coinciding with the identified failure type. The updated tracking value is then compared with a predetermined threshold limit for the identified failure type. If the threshold limit is now exceeded, a job ticket is automatically created that based on the information in the error alert. In this regard, the method may include parsing the information in the error alert to a smaller subset for use in the job ticket.

Preferably, the method includes validating the error alert prior to updating tracking values by checking the source of the error alert and the subject of the error alert. The method typically includes transmitting the created job ticket to a recipient maintenance center responsible for the network device identified in the error alert as being affected by the failure. To insure proper selection of the recipient, the method may include retrieving network device identification information and location information from the error alert, accessing a device location listing in memory with the identification information, and if necessary, correcting the location information prior to creating the job ticket.

DETAILED DESCRIPTION OF THE PREFERRED EMBODIMENTS

Figure 1:
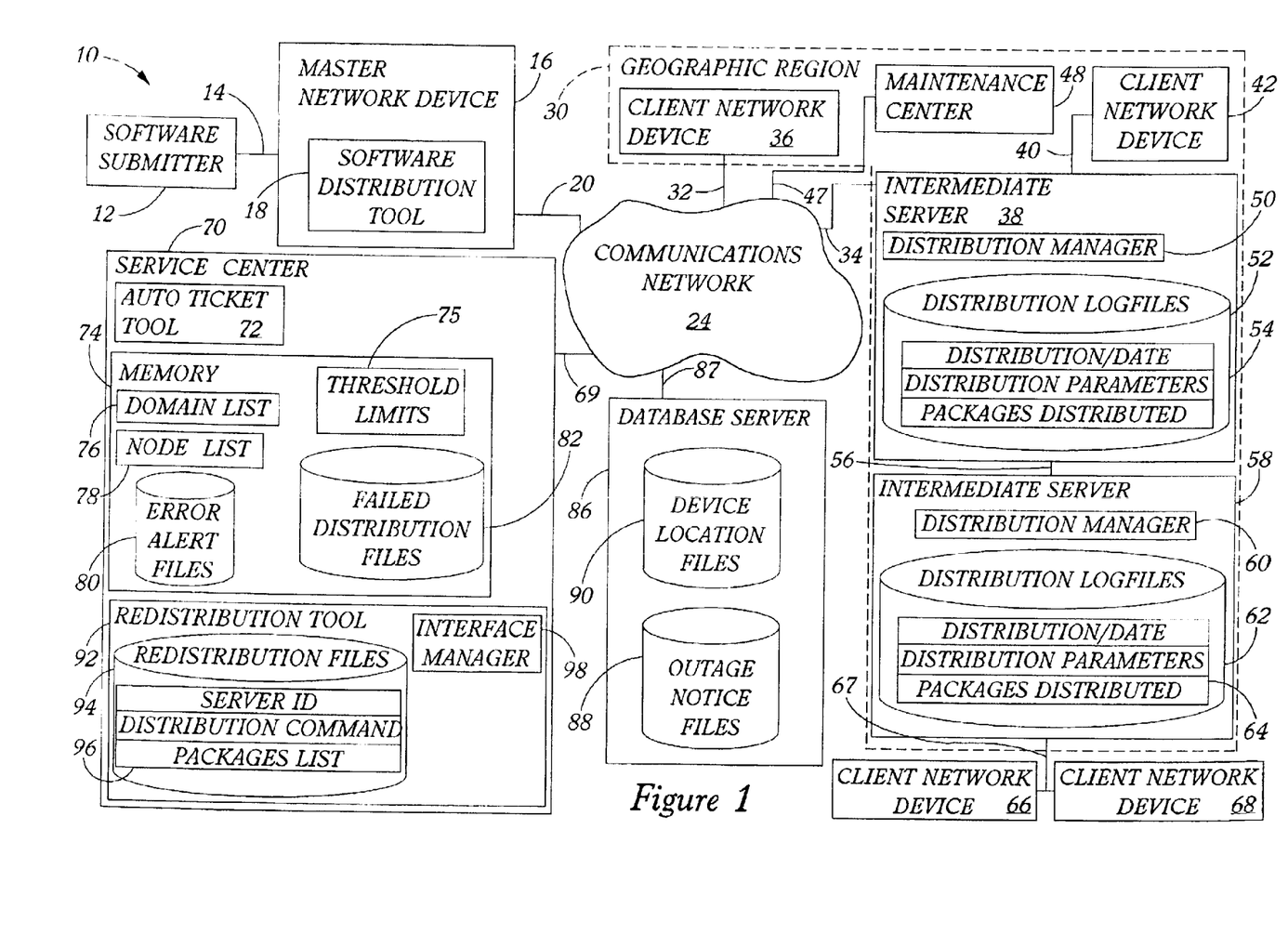
FIG. 1 illustrates a software distribution system with a service desk comprising an auto ticket tool and for automated processing of error alerts issued during software distribution and a redistribution tool for creating automating portions of the redistribution process.

FIG. 1 illustrates one embodiment of a software distribution system 10 useful for first providing automated processing of error alerts arising during software distribution throughout a computer network and second providing an enhanced redistribution of software packages that failed because of the underlying problem of the error alert. In this regard, an auto ticket tool 72 is provided that is configured to, among other tasks, receive error alerts from intermediate distribution servers and client network devices, validate the alerts, retrieve useful information from the alerts, determine when and whether a job ticket should be created, and create and distribute job tickets to appropriate maintenance facilities and personnel with verified accurate information. Once the underlying problem is resolved, a redistribution tool 92 is provided that is run on the affected intermediate distribution server to automatically identify the failed distribution jobs, retrieving distribution parameters and distribution lists, and building new distribution command strings. The combined and separate functioning of these two distribution tools 72, 92 enables the software distribution 10 to more efficiently and timely respond to distribution errors with accurate job tickets and to rapidly and effectively redistribute previously-failed packages to the addressee devices with duplicate distribution parameters.

The functions and operation of the auto ticket tool 72 and the redistribution tool 92 are described in a client/server, de-centralized computer network environment with error alerts and job tickets being transmitted in the form of e-mails. While this is a highly useful implementation of the invention, those skilled in the computer and networking arts will readily appreciate that the distribution tools 72, 92 and their features are transferable to many data communication systems that utilize numerous and varied data transfer techniques. These variations to the exemplary software distribution system 10 are considered within the breadth of the following disclosure and claims.

As illustrated, the software distribution system 10 includes a software submitter 12 in communication with a master network device 16 via data communication link 14. The software submitter 12 provides application packages to the master network device 16 for distribution to select client network devices or end users. In the following discussion, network devices, such as software submitter 12 and master network device 16, will be described in relation to their function rather than as particular electronic devices and computer architectures. To practice the invention, the computer devices and network devices may be any devices useful for providing the described functions, including well-known data processing and communication devices and systems such as personal computers with processing, memory, and input/output components. Many of the network devices may be server devices configured to maintain and then distribute software applications over a data communications network. The communication links, such as link 14, may be any suitable data communication link, wired or wireless, for transferring digital data between two electronic devices (e.g., a LAN, a WAN, an Intranet, the Internet, and the like). In a preferred embodiment, data is communicated in digital format following standard protocols, such as TCP/IP, but this is not a limitation of the invention as data may even be transferred on storage mediums between the devices or in print out form for later manual or electronic entry on a particular device.

With the application package, the software submitter 12 generally will provide a distribution list indicating which devices within the system 10 are to receive the package and distribution parameters (e.g., distribution command strings) providing instructions on how to install the application package on each receiving device. The master network device 16, e.g., a server, includes a software distribution tool 18 that is configured to distribute the application package directly or via intermediate distribution servers (such as intermediate servers 38 and 58) to each of the client network or end user devices (e.g., end user servers, computer workstations, personal computers, and the like) on the distribution list. Each intermediate server 38, 58 creates and/or stores its own subset of the distribution data (e.g., its own distribution list for each package, distribution parameters utilized in each distribution job, and the like) as is discussed in more detail below.

Configuration and operation of the software distribution tool 18 is discussed in further detail in U.S. Pat. No. 6,031,533 to Peddada et al., which is incorporated herein by reference. Additionally, the software distribution tool 18 preferably is configured to receive error alerts (e.g., e-mail messages) from network devices detailing distribution, installation, and other problems arising from the distribution of the application package.

To distribute the application package and receive error alerts, the master network device 16 is connected via communication link 20 to a communications network 24, e.g., the Internet. The software distribution system 10 may readily be utilized in very large computer networks with servers and clients in many geographic areas. This is illustrated in FIG. 1 with the use of a first geographic region 30 remote from the master network device 16. Of course, numerous geographic regions may be included in the system 10 and the master network device 16 and the service center 70 (discussed in detail below) may be in these or in other, remote geographic regions interconnected by communications network 24. For example, the master network device 16 and service desk 70 may be located in one region of the United States, the first geographic region 30 may encompass a different region of the United States, and a second geographic region may encompass one or more countries on a different continent (such as Asia, Europe, South America, and the like). Additionally, the system 10 may be expanded to include additional master network devices 16, service centers 70, and geographic regions 30.

As illustrated, the geographic region 30 includes a client network device 36 linked to the communications network by link 32, an intermediate server 38 linked to the communications network 24 by link 34, and an intermediate server 58 linked to the intermediate server 38 by link 56. This arrangement allows the software distribution tool 18 to distribute the application package to the client network device 36 (e.g., an end user server or end user device) and to the intermediate server 38 which in turn distributes the application package to the client network device 42 over link 40 and to the intermediate server 58 (for distribution to client network devices 66, 68 over link 67) over link 56. If problems arise during distribution or operations, a maintenance center 48 is provided in the geographic region 30 to provide service and is communicatively linked with link 47 to the communications network 24 to receive maintenance instructions from the service center 70 (i.e., electronic job tickets), as will be discussed in detail.

The intermediate servers 38, 58 each include a distribution manager 50, 60 for processing the distribution instructions from the software distribution tool 18, for storing or logging distribution data in distribution logfiles 52, 62, and for generating error alerts upon detecting distribution problems (among other functions). During operation, the distribution manager 50, 60 functions to store distribution data for each distribution job. In this regard, the distribution logfiles 52, 62 include records 54, 64 for each distribution comprising a distribution identification (by job number, data, and the like), distribution parameters or command strings utilized for the distribution, and a package list indicating which packages were issued in each distribution.

The distribution parameters may include a variety of information important to ensuring proper distribution and installation, such as the distribution list indicating the addresses of the package and commands particular to the addressees. For example, intermediate server 58 may include both client network device 66 and 68 on a distribution list but have "replace" parameters for only the client network device 66. To achieve proper initial distribution and later redistributions of the packages, it is very important to replicate the distribution data as closely as possible and particularly, to utilize in the redistribution the original distribution parameters. As will be understood from the discussion of the operation of the system 10 with reference to FIG. 2, the system 10 is uniquely adapted for automatically retrieving the distribution parameters and building redistribution command strings incorporating the retrieved distribution parameters.

Many problems may arise during distribution of software packages by the software distribution tool 18 and the individual intermediate servers 38, 58. An error, failure, or fault may occur due to communication or connection problems within the communications network 24 or on any of the communication links (which themselves may include a data communications network such as the Internet), and these errors are often labeled as connection errors. An error may occur for many other reasons, including a failure at a particular device to install or a failure of a server 38, 58 to distribute, and these errors are sometimes labeled as failed package and access failure errors. Many other errors and failures of package distribution will be apparent to those skilled in the art, and the system 10 is typically configured to track and process each of these errors.

Preferably, the software distribution tool 18 and/or the intermediate servers 38, 58 and client network devices are configured to create and transmit error alerts upon detection of a distribution error or fault (such as failure to complete the distribution and installation of the package). Typically, the intermediate servers 38, 58 immediately upstream of the affected device (server or end user device) are adapted to generate an error alert, e.g., an e-mail message, comprising information relevant to the package, the location of the problem, details on the problem, and other information.

The error alert is then transmitted to the master network device 16, which in turn transmits the error alert to the service center 70 for processing and response. Alternatively, the error alert may be transmitted directly to the service center 70 for processing with the auto ticket tool 72. For example, the software distribution tool 18 may initiate distribution of a package to the client network devices 66 and 68, but an error may be encountered at or downstream of intermediate server 58 that prevents installation. In response, the distribution manager 50 of the intermediate server 38 generates an error alert on intermediate server 58 to the master network device 16 providing detailed information pertaining to the problem. In some situations, the distribution manager 50 of the intermediate server 38 may attempt connection and distribution to the client network devices 66 and 68 a number of times, which may result in a number of error alerts being issued for a single problem and affected intermediate server 58.

Significantly, the software distribution system 10 includes the auto ticket tool 72 within the service center 70 to process the created error alerts to efficiently make use of resources at the maintenance center 48. In practice, the auto ticket tool 72 may comprise a software program or one or more application modules installed on a computer or computer system, which may be part of the service center 70 or maintained at a separate location in communication with the service center 70. The error alerts generated by the various server and client network devices are routed to the service center 70 over the communications network 24 via link 69 directly from the servers and client network devices or from the software distribution tool 18. As discussed previously, the error alerts may take a number of forms, and in one embodiment, comprise digital data contained in an e-mail message that is addressed and routed to the network address of the service center 70.

According to an important aspect of the auto ticket tool 72, the tool 72 is configured to process the received error alerts automatically to validate the error alerts based on their source and other criteria. In this regard, as will be discussed with reference to FIG. 3, the service center 70 includes memory 74 comprising a domain list 76 and a node list 78. These lists 76, 78 can be used in conjunction or separately by the auto ticket tool 72 to verify that the error alert originated from an appropriate source, e.g., a device within the network serviced by the system 10 and/or a device on the distribution list used by the master network device. The lists 76, 78 are preferably created and updated by the auto ticket tool 72 based on data received or retrieved from the software distribution tool 18 to improve the accurateness and currentness of the information in the lists 76, 78.

The memory 74 further includes error alert files 80 for use by the auto ticket tool 72 in storing information from the error alerts. Preferably, the information stored is parsed from the valid error alerts to include a smaller subset of the information in the error alerts that is useful for tracking and processing the error alerts and for creating job tickets. The memory 74 also includes failed distribution files 82 for storing information on which distribution jobs failed, packages were not properly distributed, which devices did not receive particular packages, and the like to allow later redistribution of these packages to proper recipient network devices. In one embodiment, the distribution jobs are sorted by date and/or time and include a field for affected intermediate server. The inclusion of this information allows an operator to determine failed distribution jobs for a particular intermediate server 38, 58 for a selectable period of time (such as fail distribution jobs for last day, week, month, or other useful time period).

The memory 74 also includes a file 75 containing the threshold limits utilized by the auto ticket tool 72 in selectively creating and issuing job tickets based on received and processed alerts. Briefly, the threshold limits 75 are a predetermined or user-selectable number of error alerts regarding a particular problem that are to be received before a job ticket will be issued to address the problem. The threshold limits may be set and varied for each type of problem or fault and may even be varied by device, region, or other factors. For example, it may be desirable to only issue a job ticket for a particular device after connection has been attempted four or more times over a selected period of time. In this manner, problems within the communications network 24 or in various data links that result in distribution failing and error alerts being created may not necessarily result in "false" job tickets being issued (e.g., the problem is in the network, such as at an ISP, rather than at the network device). For other errors, it may be desirable to set a lower threshold limit, such as, a threshold limit of one if the problem was a failed installation upon a particular device. It should be noted that the memory 74 and the auto ticket tool 72 may be located on separate devices rather than on a single device as illustrated as long as auto ticket tool 72 is provided access to the information illustrated as part of memory 74 (which may be more than one memory device).

According to another important aspect of the auto ticket tool 72, the tool 72 is configured to determine once a threshold limit is exceeded (i.e., typically, exceeding a threshold limit means to meet or exceed the set number), whether the problem can be explained by causes that do not require service. For example, network operations often require particular devices to be taken offline to perform maintenance or other services. Often, a network system will include a file or database for posting which network devices are out of service for maintenance. In this regard, the software distribution system 10 includes a database server 86 linked to the communications network 24 via link 84 having an outage notice files database 88. The auto ticket tool 72 is adapted for performing a look up within the outage notice files 88 to verify that the device is online prior to creating and issuing a job ticket. This outage checking eliminates issuing many unnecessary job tickets, which if issued add an extra administrative burden on the maintenance center 48.

As will become clear from the discussion of the operation of the auto ticket tool 72, further processing may be desirable to further enhance the quality of the issued job tickets. For example, it is preferable that the information included in the job tickets is correct and the job tickets are issued to the appropriate maintenance center 48. In this regard, the database server 86 may include device location files 90 including location information for each device in the network serviced by the system 10. With this information available, the auto ticket tool 72 preferably functions to perform searches of the device location files 90 with the location and device name information parsed from the error alerts to verify that the location information is correct. The verified location information is then included by the auto ticket tool 72 in created and transmitted job tickets. Of course, the outage notice files 88 and device location files 90 may be stored separately and in nearly any type of device as long as auto ticket tool 72 is provided access to the included information.

According to another important aspect of the invention, the software distribution system 10 further includes a redistribution tool 92 in the service center 70 (although the tool 92 could be located on a separate device) for enhancing the redistribution process after the underlying problem in the distribution system 10 has been addressed. As with the auto ticket tool 72, the redistribution tool 92 may comprise a software program or one or more application modules installed on a computer system or device which may be maintained as part of the service center 70. The redistribution tool 92 preferably is called from an affected intermediate server 38, 58 to run on that server 38, 58 to automate the redistribution process.

Figure 2:
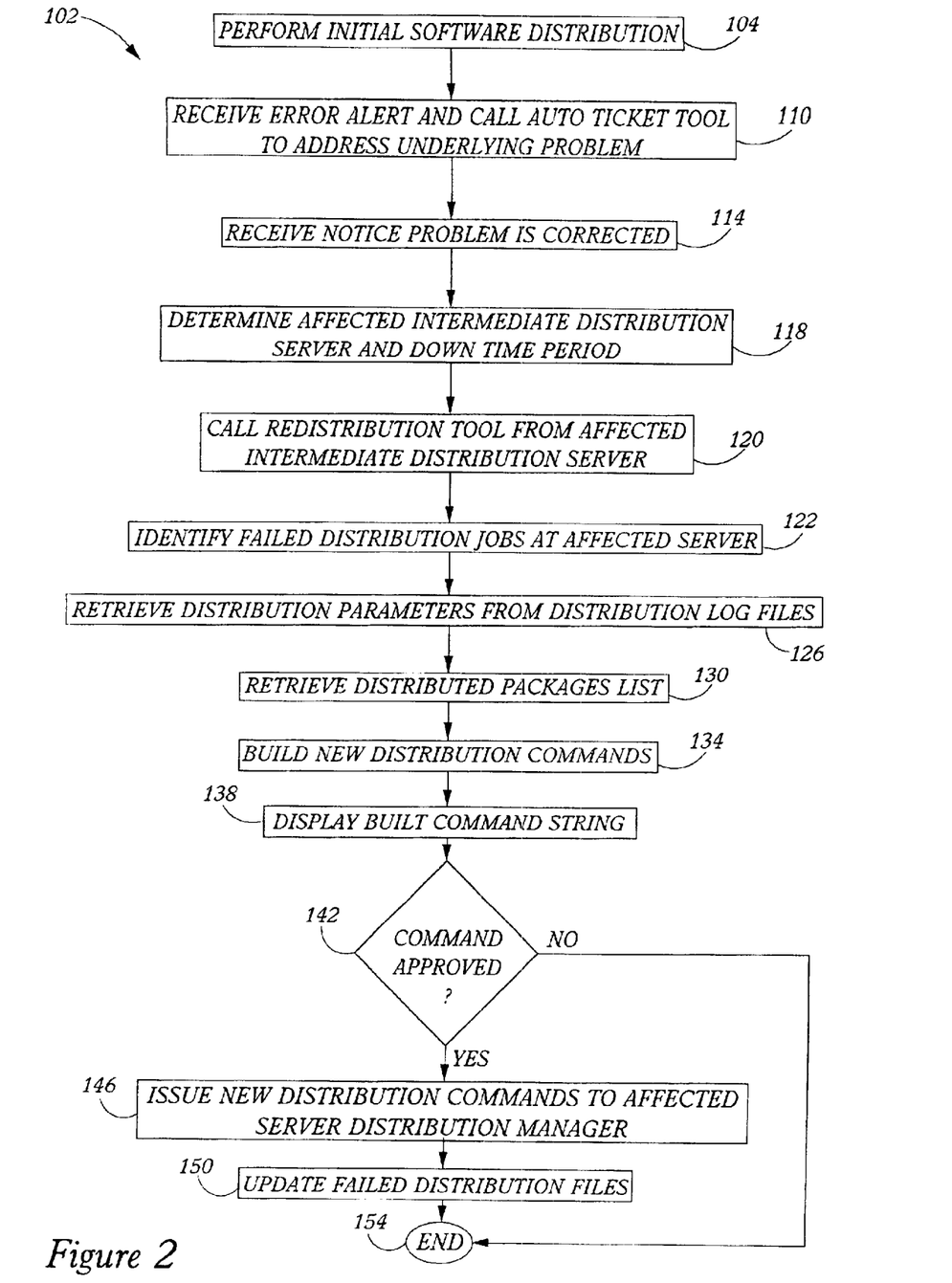
FIG. 2 is a flow diagram showing the operation of the distribution system illustrating exemplary redistribution functions of the redistribution tool of FIG. 1.

The operation of the redistribution tool 92 is discussed fully as part of the operation of the distribution system 10 with reference to FIG. 2. Briefly, however, the redistribution tool 92 functions to determine for a particular intermediate server 38, 58 the failed distribution jobs for a particular time period by accessing and retrieving data from the failed distribution files 82 or elsewhere in the system 10. For each distribution job, the redistribution tool 92 establishes a record 96 for storage in redistribution files 94 and use in building new distribution command strings for use by the distribution managers 50, 60 of a server 38, 58 in distributing failed packages.

Each distribution job record 96 in the files 94 includes information collected and/or created during the operation of the redistribution tool 92. For example, in one embodiment, a server identification field is provided for storing the name or identification of the affected intermediate server 38 or 58, a packages list of the software applications included in the original failed distribution, and distribution commands providing the distribution parameters to be used by the distribution manager 50, 60 during redistribution.

The redistribution tool 92 further includes an interface manager 98 that functions to create and manage a user interface displayed on the intermediate server 38, 58 or an attached monitoring device for collecting information from a server operator (such as an approval of the built command string, indication to proceed with redistribution, and other information) and to display data, such as the distribution list, distribution parameters, and included application packages. The interface manager 98 may be adapted to create a GUI, a command line interface, or other interface configuration useful for displaying data and collecting user data.

Referring now to FIG. 2, the operation of the distribution system 10 will be discussed highlighting the important functions of the distribution tools 72, 92 in addressing distribution errors and effectively redistributing failed packages. The software distribution process 102 begins at 104 with the initial distribution of a selected package or packages by the software distribution tool 18. Typically, as discussed previously, this distribution step 104 involves receiving at the master network device 16 a package(s) with a distribution list and distribution parameters from the software submitter 12. The software distribution tool 18 acts to distribute the application package to recipients on the distribution list and most often, to intermediate servers, such as servers 38, 58, for further distribution.

These intermediate servers 38, 58 function (with the distribution managers 50, 60 or otherwise) to process the delivery job by distributing the application package(s) with the passed distribution parameters to downstream recipients on the distribution list. The servers 38, 58 generally log distribution data pertaining to the delivery job in the distribution logfiles 52, 62 in records 54, 64. If an error or fault occurs during performance of a delivery job, an intermediate server 38, 58 (and more typically, the upstream server 38 or a server not shown) generates an error alert providing information on the affected server or device and the delivery job. The error alert is either delivered first to the master network device 16 which transmits it to the service center 70 or directly to the service center 70 for processing. For example, the error alert may include an initially declared fault (such as a connection error, a distribution fault, and the like), the package that was being delivered, the delivery job identifier, an identification of the transmitting server and the receiving device.

Figure 3:
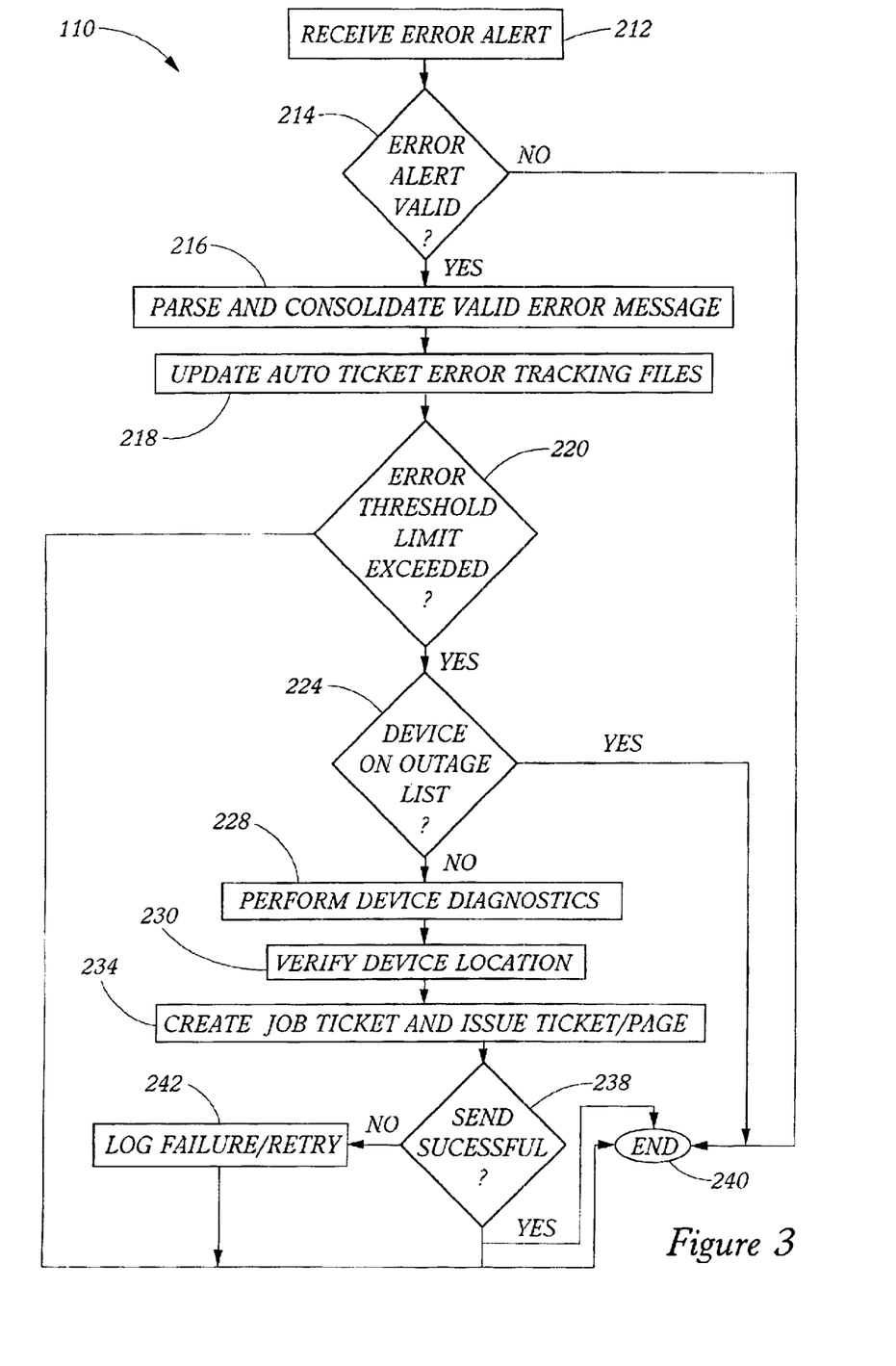
FIG. 3 is a flow diagram showing operation of the auto ticket tool of the service desk of FIG. 1 to provide the automated processing of error alerts and selective issuing of job tickets in the redistribution method of the invention.

At 110, the error alert is received at the service center 70 and the auto ticket tool 72 is called to address the underlying problem or otherwise process the error alert. Referring to FIG. 3, exemplary features of an automated error alert processing 110 carried out by the auto ticket tool 72 during distribution of software packages are illustrated. The error alert processing begins at 212 with the receipt of an error alert by the auto ticket tool 72. As discussed previously, the error alert received at 112 is generally in the form of an email message but the auto ticket tool 72 may readily be adapted to receive error alerts 112 having other formats.

To control the number of erroneous job tickets produced, the processing 110 continues at 214 with validation of the received error alert. As can be appreciated, numerous e-mail messages and improper (e.g., not relating to an actual problem) error alerts may be received by the auto ticket tool 72, and an important function of the auto ticket tool 72 is to filter out the irrelevant or garbage messages and alerts. The steps taken by auto ticket tool 72 may be varied significantly to achieve the functionality of identifying proper error alerts that should be acted upon or at least tracked.

In one embodiment, the error alert validation process 214 includes a series of three verification steps. The validation process 114 begins with the determination of whether the source of the error alert has a valid domain. For an e-mail error alert, this determination involves comparing the domain of the e-mail error alert with domains included in the domain list 76. The domains in the domain list 76 may be the full domain or Internet address or may be a portion of such domain information (e.g., all information after the first period, after the second period, the like). If the email came from a domain serviced by the system 10, the validation process 214 continues with inspection of the subject line of the e-mail message. If not from a recognized domain, the error alert is determined invalid and processing of the error alert ends at 240. Note, the domains in the domain list 76 may be further divided into domains for specific distribution efforts or for specific packages, and the auto ticket tool 72 may narrow the comparison with corresponding information in the error alert.

In this embodiment, validation 214 continues with inspection of the subject line of the error alert in an attempt to eliminate garbage alerts or messages that are not really error alerts. For example, e-mail messages may be transmitted to the auto ticket tool 72 that are related to the distribution or error but are not an error alert (e.g., an end user may attempt to obtain information about the problem by directly contacting the service desk 70). To eliminate these misdirected or inappropriate error alerts, the auto ticket tool 72 in one embodiment functions to look for indications of inappropriate error alerts such as "forward" or "reply" in the e-mail subject line. The presence of these words indicates the e-mail error alert is not a valid error alert, and the validation process 214 is ended.

If the subject line of the error alert is found to be satisfactory, the validation 214 continues with validation of the node name of the device that transmitted the error alert. Typically, the node name is provided as the first part of the network or Internet address. Validation is completed by comparing the node name of the source of the error alert with node names in the node list 78. If the node name is found, the e-mail error alert is validated and processing ends. If not, the error alert is invalidated and auto ticket tool 72 ends processing of the error alert at 240. Again, the node names in the node list 78 may be grouped by distribution effort and/or application packages. In the above manner, the auto ticket tool 72 effectively reduces the number of error alerts used in further processing steps and controls the number of job tickets created and issued.

Referring again to FIG. 3, the error alert processing 110 continues at 216 with the validated error alert. Significantly, the auto ticket tool 72 is adapted to filter the amount of information in each error alert to increase the effectiveness of later tracking of error alerts and distribution problems while retaining information useful for creating accurate job tickets. At 216, the auto ticket tool 72 functions to parse information from the valid error alert for later use in error alert processing 110. As part of the file-updating step 218, the parsed information may be stored in various locations such as a record in the error alert files 80. Additionally, the parsed information may be stored in numerous configurations and may be contained in files related to each network device (e.g., servers and client network devices) or related to specific types of problems.

The type of information that may be parsed and stored in the error alert files 80 for each validated and parsed error alert may vary significantly as part of the invention. In one embodiment, each record includes an error alert identification field for containing information useful for tracking particular error alerts. A geographic region field is provided that contains adequate location information to allow the auto ticket tool 72 to sort the error alerts by geographic region and corresponding maintenance center, which enables job tickets to be transmitted to the maintenance center responsible for servicing the device related to the error alert. In some situations, sorting by geographic region also enables the auto ticket tool 72 to produce reports indicating errors occurring in specific geographic regions which may be utilized to more readily identify specific service problems (such as a network link problem in a specific geographic area).

The error alert record may further include a computer server name field for storing the name of the device upon which installation of the distributed package failed. This information is useful for completion of the job ticket to allow maintenance personnel to locate the device. The device name is also useful for checking if the device has been intentionally taken offline (see step 224). Additionally, in some embodiments of the invention, error alert files 80 may include tracking files or records (not shown) for each device serviced by the system 10. Such records may include a field for each type of problem being tracked by the auto ticket tool 72 for storing a running total of the number of error alerts received for that device related to that specific problem. When the total in any of the problem or error fields for a particular device exceeds (or meets) a corresponding threshold limit 75, auto ticket tool 72 continues the process of verifying whether a job ticket should be created and issued for that device. Use of the threshold limit is discussed in more detail in relation to step 220.

Additional fields that may be included in the error alert records include, but are not limited to, a domain field for the source of the error alert, a failed package field for storing information pertaining to the distributed package, and an announced failure field for storing the initially identified problem. The announced failure field is important for use in tracking the number of error alerts received pertaining to a particular problem (as utilized in step 120) and for inclusion in the created job ticket to allow better service by the maintenance center 48. An intermediate server name field 174 is included to allow tracking of the source of the error alert. Additionally, an action taken field is provided to track what, if any, corrective actions have been taken in response to the error alert. Initially, the action taken field will indicate no action because this information is not part of the parsed information from the error alert.

The error alert process 110 at 218 involves updating error ticket tracking files maintained by the auto ticket tool 72. As noted, these files may include database records of each error alert and preferably include a record for each device serviced by the system 10 for which errors may arise. Hence, updating 218 may involve storing all of the parsed information in records, such as record, and may include updating the record of the affected network device. For example, the record for the affected network device may be updated to include a new total of a particular error for later use in the processing 110.

At 220, the auto ticket tool 72 acts to determine if an error threshold limit has been exceeded after the receipt and addition of the validated error alert to the tracking files. If a threshold is not exceeded, processing 110 is ended at 240, but when a threshold is exceeded, processing 110 continues at 224 to determine if a job ticket should be issued. As discussed above, the threshold limits 75 are set for each type of problem anticipated during distribution of a package by the software distribution tool. The limits may be initially set for the entire network, be set for parts of the network (and even particular devices within the network), and preferably, may be later adjusted by an operator of the service center 70 to allow adaptation of the system 10 to changing network and equipment conditions. At 220, auto ticket tool 72 may function to determine if a threshold has been exceeded in a number of acceptable ways.

For example, the parsed information in a record for the error alert may be used to obtain the announced failure and this information may be used to total the number of that type of errors that have occurred. In addition, the information in the computer server name field may be used to identify the affected network device and the totaling of the particular type of error may be completed with reference only to that particular, affected device. Alternatively, auto ticket tool 72 may function to look up the device named in the error alert to determine if any of its error totals now exceed the applicable threshold from threshold limits 75. Clearly, other threshold verification techniques and tracking may be employed as part of the invention.

If a threshold is exceeded, processing 110 continues at 224 with the auto ticket tool 72 operating to determine if the affected network device (i.e., the device indicated on the most recent error alert) has been placed out of service or offline for maintenance (typically, maintenance unrelated to the distribution of the package). In the illustrated embodiment of the system 10, the auto ticket tool 72 performs a look up for the affected device by name or by other identifying information in the outage notice files 88, which are preferably updated by the maintenance center 48 and network operators to indicate when particular devices are out of service or offline. If the affected device is found in the outage notice files 88, processing is ended at 240. Additionally, in some embodiments, the auto ticket tool 72 then acts to update the tracking files 80 to remove the error alert from the databases such that running totals of errors are not affected by information in this error alert.

If the affected device is not on an outage listing, the auto ticket tool 72 continues processing 110 at 228 by running a series of diagnostics on the affected device. These diagnostics are utilized to identify network problems that indicate whether the problem lies with the device or within the network itself. For example, Packet Internet Groper (PING) may be run to test whether the device is online. Additionally or alternatively, the diagnostics may include running Traceroute software to analyze the network connections. The diagnostic information obtained in step 228 preferably is included in the job ticket issued on the affected device to assist in addressing the problem. Alternatively, certain diagnostic results may indicate that a job ticket should not yet be issued for the device and the processing 110 may be ended at 240 without creation of a job ticket (which may also indicate that error-tracking databases should be updated).

After performing device diagnostics, the auto ticket tool 72 operates at 230 to verify the accuracy of at least some of the information parsed from the error alert prior to creation of the job ticket. Specifically, auto ticket tool 72 operates to cross check the name and/or network address of the device and the location provided in the error alert with the location and device name and/or network address provided in the device location files 90, which are maintained by system administrators indicating the location (i.e., building and room location of each device connected to the network serviced by the system 10). The device name often will comprise the MAC address and the IP address to provide a unique name for the device within the network. If the name is matched but the location information is not matched, the auto ticket tool 72 may function to retrieve the correct location information from the device location files and place this in the error alert files 80 for this particular device.

At 234, the auto ticket tool 72 creates a job ticket and issues the job ticket to the appropriate maintenance center 48. The information included in the job ticket may be varied but typically will at least include the name of the affected device, the announced failure, the number of error alerts (e.g., the threshold limit or one over the threshold limit), the time and date of the error alerts, diagnostic information, the package being distributed, and the location of the device. The job tickets in one embodiment are created in e-mail form from an electronic template maintained by the auto ticket tool 72 or another device (not shown). The auto ticket tool 72 automatically retrieves the appropriate information for the template fields from the error alert tracking files 80 or as gathered in previous steps of the processing 110 and fills in the fields of the job ticket template.

The completed job ticket is then transmitted via link 69 and the communications network 24 to the appropriate maintenance center 48 based on parsed geographic region information and/or verified location information. The transmittal of the job ticket may be completed immediately upon completion of the template or the ticket may be held for periodical transmittal (such as once a shift or once a day, week, and the like) for each device, for select locations (certain buildings), and/or for each maintenance center 48. Instead of transmitting the job tickets to a central maintenance center 48, the job tickets may be routed to a service desk queue on a network device located in the same building where the affected network device is positioned. If a building does not have service personnel, the job ticket would be routed to a nearby building which houses service personnel and this location information is included in the error alert files 80.

Additionally, in some embodiments, the job ticket is later modified to include information based on other error alerts. For example, the job ticket may be held by the auto ticket tool 72 for a predetermined period of time (e.g., until the end of a work shift or calendar day) and other job created job tickets added or combined with the initially created job ticket. In this manner, the number of job tickets issued for each device or to each maintenance center is further managed by the auto ticket tool 72.

At 238, auto ticket tool 72 operates to verify that the job ticket was successfully transmitted to the addressee maintenance center 48. If successful, the processing ends at 240 and the auto ticket tool 72 waits for receipt of the next error alert. If the transmittal was not successful, the auto ticket tool 72 logs the failure and preferably is adapted to retry transmittal one or more times. For example, each job ticket may be transmitted four times prior to logging failure and ending the processing 110 at 240. The first retry may be immediate and each successive retry attempted after a given period of time (e.g., after 30 seconds, after 5 minutes, after 1 hour, and the like) to allow problems in the network to be corrected.

In one embodiment of the invention, the auto ticket tool 72 is further adapted to determine whether a maintenance personnel associated with the maintenance centers 48 should be directly contacted (e.g., paged, emailed with the job ticket, or otherwise alerted to the problem). To achieve this function, a record may be kept in memory 74 for each device with information as to whether a page or immediate alert is appropriate for that device. The paging information may be more specific to request a page be transmitted when specific problems at a device exceed the threshold limit. Preferably, the paging information includes an on and off setting to enable an operator of the service center 70 to readily switch each device's paging settings.

Referring again to FIG. 2, the distribution process 102 continues with notification at 114 that the undertying device or communication network problem has been corrected. In one embodiment, notification is provided by a message from the relevant maintenance center 48, but in other embodiments the master network device 16 or die auto ticket tool 72 may be adapted for monitoring progression of repairs to identify when a device or communication link identified as an underlying problem in a job ticket comes beck on line.

The distribution process 102 continues at 118 with determination of the affected intermediate distribution server and the down time period (or time of interest for redistribution). The down time period can be the actual time a distribution device was out of service or the time period measured from the last distribution servicing of the device. At 102, an operator may complete this function by reading issued job tickets. Alternatively, the step 102 may be accomplished with periodic (such as daily, weekly, or some other time period) servicing of each intermediate server 38, 58 (i.e., logging on to the server 38, 58 and calling redistribution tool 92, and running the tool 92 for a previous time period, such as the prior week). In yet another embodiment, the redistribution tool 92 or the software distribution tool 18 may operate to monitor distribution Jobs, to log failed distributions, to identify when down devices are repaired, and in response, sending a message to the an appropriate maintenance center 48 to log onto an affected intermediate server 38, 58 to initiate redistribution from the server.

In general, the redistribution steps of the process 102 can be thought of as a semi-automatic mass redistribution or batch process. It is usually initiated manually at 120 by an operator logging onto an affected server 38, 58 or other device (i.e., the server or device identified in an issued job ticket or received error alert) and then calling the redistribution tool 92 over the communications network 24. In a preferred embodiment, once the redistribution tool 92 is called at 120, it functions automatically (in the following steps 122–138) to build a redistribution job for the affected intermediate server 38, 58 or other device.

The redistribution tool 92 acts at 122 to identify failed distribution jobs at the affected intermediate server 38, 58. In one embodiment, this is accomplished by accessing the auto ticket tool 72 failed distribution files 82 and searching for records indicating failures at the affected server 38, 58. The search may also be limited by other criteria such as for a certain time period, but generally the goal is to identify all failed deliveries for inclusion in the redistribution effort. For each identified distribution job, redistribution tool 92 creates a record 96 for storing data in the files 94 for use in the redistribution process.

At 126, the redistribution tool 92 searches the distribution logfiles 52, 62 of the affected intermediate server 38, 58 to retrieve the distribution parameters or command strings for each identified failed distribution or delivery job. This information is then stored in the records 96 in the redistribution files 94. Typically, this search is performed more efficiently by only searching the logfiles 52, 62 for the dates applicable to the failed delivery by the intermediate server 38, 58. Next, at 130, the redistribution tool 92 searched the logfiles 52, 62 for package names in each failed distribution job. This information is also stored in the redistribution files 94 in a packages list of the record 96 for each failed distribution job.

The redistribution tool 92 then acts at 134 to build new command strings for each failed distribution job including the stored distribution parameters and the distribution recipients (i.e., the distribution list). The newly created distribution command string for use in redistribution is then displayed by the interface manager 98 on the affected intermediate server 38, 58. As part of the display, the interface manager 98 requests operator input indicating whether the built redistribution command string is acceptable to the operator (i.e., whether redistribution should proceed).

At 142, the operator provides input indicating whether the redistribution command strings are approved. If not, the process 102 ends at 154. In an alternate embodiment, the process 102 continues with the operator providing changes to the displayed command strings and then indicating that redistribution should continue with the modified redistribution command strings. If the operator approves of the displayed commands at 142, the distribution process 102 continues at 146 with the redistribution tool 92 passing or issuing the new redistribution command string to the distribution manager 50, 60 of the affected intermediate server 38, 58. The distribution manager 50, 60 then performs the distribution of identified software packages and with the original distribution parameters to recipient devices on the distribution list (i.e., completes the software delivery job as originally commanded by the software distribution tool 18 prior to the fault or failure).

At 150, the redistribution tool 92 performs the housecleaning task of updating the failed distribution files 82 (or instructing the auto ticket tool 72 to perform this task). This update is useful for removing error alert and delivery job data from the files 82 or "staging" area as each distribution job is completed by the system 10. In this manner, the system 10 avoids duplicating redistribution efforts in future operations of the redistribution tool 92 when such efforts have been successful in distributing the software packages.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the distribution tools 72, 92 may readily be utilized with multiple software distribution tools 18 and a more complex network than shown in FIG. 1 that typically will include more geographic regions and intermediate servers and client network devices and combinations thereof. Similarly, the descriptive information and/or strings collected from the error alerts and included in the created job tickets may also be varied.

What is claimed is:

1. A method for redistributing software packages in a distributed computer network after a failed, original distribution attempt, the distributed computer network including a master device adapted for initiating the original distribution attempt, a plurality of intermediate distribution devices for distributing the software packages as instructed by the master device, and a plurality of recipient network devices, the method comprising:

determining one of the intermediate distribution devices affected by the failed original distribution attempt;

identifying a distribution job that failed at the affected intermediate distribution device;

retrieving distribution parameters from the affected intermediate distribution device comprising distribution control commands received from the master device during the original distribution attempt;

operating the affected intermediate distribution device to build new distribution commands for the failed distribution job from the retrieved distribution parameters; and initiating and performing a redistribution of a set of software packages from the affected intermediate distribution device based on the new distribution commands.

2. The method of claim 1, further including retrieving from the affected intermediate distribution device the set of software packages from a log file for the failed distribution job.

3. The method of claim 1, further including creating a user interface, displaying the new distribution commands on the user interface, and receiving approval input for the new distribution commands prior to the performing.

4. The method of claim 1, wherein the identifying, the distribution parameters retrieving, and the building of the new distribution commands are performed automatically by a redistribution tool running on the affected intermediate distribution device.

5. The method of claim 4, further including after the determining, calling the redistribution tool over a communications network to execute on the affected intermediate distribution device.

6. The method of claim 4, wherein the redistribution performing is completed by a distribution manager running on the affected intermediate distribution device and the redistribution performing includes transmitting the new distribution commands from the redistribution tool to the distribution manager.

7. The method of claim 1, wherein the determining comprises accessing and searching records of failed distribution files storing information parsed from error alert messages generated within the distributed computer network.

8. The method of claim 7, further including after the redistribution performing, updating the failed distribution files to remove information corresponding to the failed distribution job at the affected intermediate distribution device.

9. The method of claim 1, wherein the distribution parameters retrieving further includes retrieving a distribution list for the failed distribution job and wherein the new distribution commands building includes creating a distribution list for use in the redistribution identifying the recipient network device that are to receive the set of software.

10. A computer system for distributing software in a distributed computer network having a plurality of intermediate distribution servers and end user devices communicatively-linked to a data communications network, comprising:

a master network device linked to the communications network end adapted for transmitting a distribution job for a set of software packages to select ones of the intermediate distribution servers, wherein the distribution job includes distribution data comprising a distribution list of the end user devices and distribution parameters including instructions on how to install the software packages; and a redistribution tool configured for retrieving the distribution parameters and the distribution list from an affected one of the selected intermediate distribution servers that failed to complete the distribution job, for building commands for a redistribution of the distribution job from the retrieved distribution parameters and the distribution list, and issuing the redistribution commands to a distribution manager running on the affected intermediate distribution server to cause initiation of a redistribution job.

11. The computer system of claim 10, wherein the affected intermediate distribution server includes a log file for the tailed distribution job and the redistribution tool automatically accesses and searches the log file to retrieve the distribution parameters and the distribution list for the failed distribution job.

12. The computer system of claim 11, wherein the log file further includes a list of the software packages for the failed distribution job and the redistribution tool retrieves the list and includes the list in the redistribution commands.

13. The computer system of claim 10, wherein the redistribution tool includes an interface manager configured for generating an interactive user interface at the affected intermediate distribution server to display the redistribution commands and to receive approval input from an operator prior to the issuing of the redistribution commands.

14. The computer system of claim 10, wherein the redistribution tool is maintained on a server linked to the communications network and is called from the affected intermediate distribution server to execute on the affected intermediate distribution server.

15. A software distribution method, comprising:

performing an initial distribution of a set of software applications over a data communications network including transmitting a distribution list, distribution commands, and the software applications to intermediate servers for further distribution of the software applications to end user devices;

receiving an error alert message indicating a failure at an affected one of the intermediate servers to complete the initial distribution;

automatically building a job ticket based on the error alert message and transmitting the job ticket over the communications network to a maintenance center to initiate correction of a problem underlying the failure at the affected intermediate server;

after the underlying problem has been, corrected, running a redistribution tool on the affected intermediate server to automatically generate a set of redistribution commands; and performing a redistribution of the software applications from the affected intermediate server based on the redistribution commands.

16. The method of claim 15, wherein the redistribution tool running includes identifying the failed initial distribution on the affected intermediate server, retrieving a copy of the distribution commands for the failed initial distribution stored by the affected intermediate server, and using the retrieved distribution commands in the generation of the redistribution commands.

17. The method of claim 16, wherein the redistribution tool running further includes displaying the redistribution commands at the affected intermediate server, querying for an approval of the displayed redistribution commends, and if approval received, issuing the redistribution commands to a distribution manager of the affected intermediate server to initiate the redistribution performing.

18. A computer service method for selectively creating job tickets in response to error alerts, the error alerts being created during package distribution on a computer network comprising a plurality of network devices and including information related to package distribution failure, the method comprising:

receiving an error alert;

processing the error alert to identify a failure type from the failure information;

updating an error tracking file comprising tracking values for each of the failure types to incrementally change a tracking number for the identified failure type;

comparing the updated tracking value for the identified failure type to a threshold limit for the identified failure type to determine if the threshold limit is exceeded;

when the comparing determines the threshold limit is exceeded, creating a job ticket including at least a portion of the failure information from the error alert to initiate service in the computer network;

running a redistribution tool on a one of the network devices determined to have failed to complete the package distribution to automatically generate a set of redistribution commands; and performing a redistribution of software applications contained in the package distribution from the failed one of the network devices based on the redistribution commands.

19. The method of claim 18, wherein the threshold limits are predetermined and stored in memory accessible during the comparing and wherein the threshold limits are selected to differ for at least some of the failure types.

20. The method of claim 18, wherein the redistribution tool running includes identifying the failed package distribution on the affected, failed network device, retrieving a copy of distribution commands for the failed package distribution stored by the affected network device, and using the retrieved distribution commands in the generation of the redistribution commands.

21. The method of claim 18, wherein the error alert processing further includes retrieving identification data on a network device affected by the package distribution failure, the method further includes determining with the identification data whether the affected network device is included on an outage list, and further wherein the job ticket creating is not completed when the affected network device is determined to be included on the outage list.

22. The method of claim 18, wherein the error alert processing further includes retrieving identification data on a network device effected by the package distribution failure and further wherein the tracking values for each of the failure types are included in the error tracking file for each of the network devices.

23. The method of claim 22, wherein the threshold limits are selectable for each of the network devices.

24. The method of claim 18, wherein the error alert processing further includes retrieving location information for a network device affected by the package distribution failure for use in the job ticket creating, and further wherein the method includes matching the retrieved location information with device location information stored in memory and when a match is not achieved, modifying the retrieved location information to match the device location information.

25. The method of claim 18, further including processing the error alert to retrieve location information for the network device affected by the package distribution failure, determining a job ticket recipient from a set of network maintenance centers based on the location information, and transmitting the created job ticket to the job ticket recipient.

26. The method of claim 25, wherein the job ticket is an e-mail message and the transmitting uses a data communications network, and further wherein the transmitting comprises verifying whether the transmitting was completed and if not successful, repeating the transmitting a predetermined retry value.

* * * * *

UNITED STATES PATENT AND TRADEMARK OFFICE
CERTIFICATE OF CORRECTION

PATENT NO. : 6,845,394 B2
DATED : January 18, 2005
INVENTOR(S) : Scott D. Ritche It is certified that error appears in the above-identified patent and that said Letters Patent is hereby corrected as shown below:

<u>Column 17,</u>
Line 56, "end" should be -- and --

<u>Column 18,</u>
Line 8, "tailed" should be -- failed --
Line 10, "falled" should be -- failed --

Signed and Sealed this

Tenth Day of May, 2005

JON W. DUDAS
*Director of the United States Patent and Trademark Office*